Patented Feb. 21, 1928.

1,659,993

UNITED STATES PATENT OFFICE.

MELVIN DE GROOTE, OF ST. LOUIS, AND WILBUR C. ADAMS, OF UNIVERSITY CITY, MISSOURI, ASSIGNORS TO WM. S. BARNICKEL & COMPANY, OF WEBSTER GROVES, MISSOURI, A CORPORATION OF MISSOURI.

PROCESS FOR BREAKING PETROLEUM EMULSIONS.

No Drawing.   Application filed June 17, 1926. Serial No. 116,734.

This invention relates to the treatment of emulsions of mineral oil and water, such as petroleum emulsions, for the purpose of separating the oil from the water.

Petroleum emulsions are of the water-in-oil type and comprise fine droplets of natural occurring waters or brines dispersed in a more or less permanent state throughout the oil which constitutes the continuous phase of the emulsion. They are obtained from producing wells and from the bottom of oil storage tanks and are commonly referred to as "cut oil," "roily oil," "emulsified oil" and "bottom settlings."

In our pending application for patent Serial No. 59,954, filed October 1, 1925, we have described a process for breaking or separating petroleum emulsions of the kind referred to, that is distinguished from prior processes used to break such emulsions, in that it contemplates subjecting the emulsions to the action of a treating agent consisting of a mixture comprising a condensation product containing a sulpho-aromatic, soap-forming acid in which the sulphonic group is joined directly to the non-carboxyl end of the aliphatic hydrocarbon chain.

We have discovered that when the treating agent contemplated by the process described in our said pending application for patent is produced on a commercial scale by one of the methods of manufacture described in said application, that a mechanical mixture of allied bodies is obtained, which mixture, in addition to comprising a condensation product containing a sulpho-aromatic, soap-forming acid in which the sulphonic group is joined dirctly to the non-carboxyl end of the aliphatic hydrocarbon chain, also contains certain complex sulpho-aromatic, soap-forming bodies, which, while lacking the distinguishing characteristic of the treating agent contemplated by our said process, are of equal or greater value as agents for treating petroleum emulsions. Therefore, we desire to protect by this application for patent a process for breaking or separating emulsions of mineral oil and water that is restricted to the use of a treating agent consisting of a mixture that contains such complex sulpho-aromatic, soap-forming bodies.

In view of the difficulty of analyzing such complex organic bodies to determine their chemical composition, we will define the treating agent contemplated by our present process by the method employed to produce said agent, as this will enable those skilled in the art to understand and practice our invention, and moreover, will clearly define the metes and bounds of the invention.

The method employed to produce the treating agent used in our present process, broadly stated, consists in condensing the sulphonate of an aromatic hydrocarbon with an hydroxylated, soap-forming body in the presence of a dehydrating agent. By the expression "soap-forming body" it is meant to denote those organic groups which combine with soluble hydrates to give soap-like detergents. These substances include fatty substances, such as ricinoleic acid; hydroxylated resinous substances, such as hydroxyrosin; and hydroxylated, naphthenic acid, such as may be found in petroleum sludges. All of these substances are characterized by their ability to combine with alkali to produce soap. They are all characterized by containing the hydroxy group in the non-carboxyl position of the hydrocarbon chain. We prefer to use fatty substances, due to their ease of reaction. Specifically, we prefer to use hydroxystearic acid produced from oleic acid.

The aromatic substances employed may be one or more of the common coal tar substances, such as benzene, toluene, zylene, cresol, phenol, naphthalene, naphthol, anthracene, tetralin, etc. The production of the sulphonate of these substances is well known commerically, and is a known state of the art. In essence it consists in subjecting the substances to the action of sulphuric acid of various strengths at various temperatures and in various degrees of excess reagent. Poly-sulphonic acids such as di or tri-sulphonic acids are entirely suitable for our process.

As a specific example, the preferred procedure is to first convert phenol into phenol mono-sulphonate and convert oleic acid into hydroxystearic acid, then mix these two materials in molecular proportions, and thereafter subject said mixture to the action of any suitable dehydrating agent, such as sulphuric acid.

The above reactions produce a condensation product. The expression "condensation product" has been used because the chemical reactions involved in part contemplate dehydration as is illustrated in the formation of an ester or a lactone. Said substances may be of an acidic character, and in using such products, we prefer to use the water-soluble salts obtained by neutralization of the acidic material by means of caustic soda, potash or ammonia. However, the water-insoluble salts, such as calcium or magnesium salts, or the esters, such as the methyl or ethyl ester, can be employed. These materials can be used directly in undiluted form or in dilute form, and when diluted, water or oil is the most desirable solvent to use.

In practising our process the treating agent, consisting of a substance of the character above described, is brought into contact with an emulsion, either by introducing the treating agent into a well in which a petroleum emulsion is being produced; introducing the treating agent into a conduit through which a petroleum emulsion is flowing; introducing the treating agent into a tank in which a petroleum emulsion is stored, or introducing the treating agent into a container that holds the sludge obtained from the bottom of an oil storage tank. The treating agent can even be introduced into a producing well in such a way that it will become mixed with water or oil that is emerging from the ground before said water and oil enter the barrel of the well pump or the tubing up through which said water and oil flow to the surface of the ground. After any of the various treatments above referred to the emulsion is allowed to stand in a quiescent state at a suitable temperature, so as to permit the water or brine to separate from the oil, or it may be passed through a variety of apparatus, such as hay tanks, gun barrels, etc., such as are now commonly used for "breaking" petroleum emulsions. It may even be passed through a heating apparatus, a centrifugal or electrical dehydrator, or an emulsifying device, with or without the addition of water to the emulsion, or it may be subjected to action by a combination of two or more of the devices above referred to.

Having thus described our invention, what we claim as new and desire to secure by Letters Patent is:

1. A process for breaking or separating petroleum emulsions, characterized by subjecting the emulsion to the action of a treating agent consisting of a mixture comprising a condensation product containing a sulpho-aromatic, soap-forming acid and other complex organic bodies, produced by subjecting an hydroxylated, soap-forming acid, and a sulphonate of an aromatic hydrocarbon to the action of a dehydrating agent.

2. A process for breaking or separating petroleum emulsions, characterized by subjecting the emulsion to the action of a treating agent consisting of a mixture comprising a condensation product containing a sulpho-aromatic, soap-forming acid and other complex organic bodies, produced by subjecting an hydroxylated fatty acid, and a sulphonate of an aromatic hydrocarbon to the action of a dehydrating agent.

3. A process for breaking or separating petroleum emulsions, characterized by subjecting the emulsion to the action of a treating agent consisting of a mixture comprising a condensation product containing the salts of a sulpho-aromatic, soap-forming acid and other complex organic bodies, produced by subjecting an hydroxylated fatty acid and a sulphonate of an aromatic hydrocarbon, to the action of a dehydrating agent.

4. A process for breaking or separating petroleum emulsions, characterized by subjecting the emulsion to the action of a treating agent consisting of a mixture comprising a condensation product containing the water-soluble salts of a sulpho-aromatic, soap-forming acid and other complex organic bodies, produced by subjecting an hydroxylated fatty acid and a sulphonate of an aromatic hydrocarbon, to the action of a dehydrating agent.

5. A process for breaking or separating petroleum emulsions, characterized by subjecting the emulsion to the action of a treating agent consisting of a mixture comprising a condensation product containing the ammonium salts of a sulpho-aromatic, soap-forming acid and other complex organic bodies, produced by subjecting an hydroxylated fatty acid and a sulphonate of an aromatic hydrocarbon, to the action of a dehydrating agent.

MELVIN DE GROOTE.
WILBUR C. ADAMS.